(12) United States Patent
Yamada et al.

(10) Patent No.: US 11,188,149 B2
(45) Date of Patent: Nov. 30, 2021

(54) IMAGE DISPLAY DEVICE USING RETINAL SCANNING DISPLAY UNIT AND METHOD THEREOF

(71) Applicant: UNIVERSITY OF FUKUI, Fukui (JP)

(72) Inventors: Shoji Yamada, Fukui (JP); Toshio Katsuyama, Fukui (JP)

(73) Assignee: UNIVERSITY OF FUKUI, Fukui (JP)

( * ) Notice: Subject to any disclaimer, the term of this patent is extended or adjusted under 35 U.S.C. 154(b) by 0 days.

(21) Appl. No.: 16/961,827

(22) PCT Filed: Jan. 25, 2019

(86) PCT No.: PCT/JP2019/002512
§ 371 (c)(1),
(2) Date: Jul. 13, 2020

(87) PCT Pub. No.: WO2019/155916
PCT Pub. Date: Aug. 15, 2019

(65) Prior Publication Data
US 2021/0080727 A1    Mar. 18, 2021

(30) Foreign Application Priority Data
Feb. 9, 2018 (JP) .............................. JP2018-021853

(51) Int. Cl.
*G06F 3/01* (2006.01)
*G02B 26/10* (2006.01)
(Continued)

(52) U.S. Cl.
CPC ............. *G06F 3/013* (2013.01); *G02B 26/10* (2013.01); *G02B 27/0172* (2013.01); *G02B 30/22* (2020.01); *G02B 2027/0187* (2013.01)

(58) Field of Classification Search
CPC .... G02B 27/0172; G02B 27/02; G02B 26/10; G02B 2027/0187; G02B 30/00; G06F 3/013; H04N 5/64; G09G 5/00
See application file for complete search history.

(56) References Cited

U.S. PATENT DOCUMENTS 5,715,384 A    2/1998  Ohshima et al.
5,751,259 A    5/1998  Iwamoto
(Continued)

FOREIGN PATENT DOCUMENTS

JP    2708189 B2    2/1998
JP    3143558 B2    3/2001
(Continued)

OTHER PUBLICATIONS

Apr. 16, 2019 Search Report issued in International Patent Appliation No. PCT/JP2019/002512.

*Primary Examiner* — Alexander Eisen
*Assistant Examiner* — Kebede T Teshome
(74) *Attorney, Agent, or Firm* — Oliff PLC

(57) ABSTRACT

When a predetermined image is displayed for a user such that the user is able to visually recognize the image, the user sight line direction is detected, a part assumed to be present in the detected user sight line direction is set to a first image, an image complementary to the first image for the predetermined image is set to a second image, the positions of the retinas of the eyes of the user are scanned with laser light from a retinal scanning display unit fitted to the head of the user and the first image is focused on a position away from the position of the eyes of the user by a first distance and is displayed. The second image is displayed on the surface of the panel of a panel display unit in a position away from the user by a second distance shorter than the first.

11 Claims, 9 Drawing Sheets

(51) Int. Cl.
*G02B 27/01* (2006.01)
*G02B 30/22* (2020.01)

(56) References Cited

U.S. PATENT DOCUMENTS

| | | | |
|---|---|---|---|
| 2008/0258996 A1* | 10/2008 | Takayama | G06F 3/1446 345/1.3 |
| 2013/0044109 A1* | 2/2013 | Hong | G02B 27/0093 345/419 |
| 2017/0010467 A1* | 1/2017 | Ellsworth | G02B 27/0172 |
| 2017/0072305 A1* | 3/2017 | Watanabe | G06F 3/017 |
| 2017/0160796 A1 | 6/2017 | Oto | |
| 2018/0373041 A1 | 12/2018 | Sugawara et al. | |

FOREIGN PATENT DOCUMENTS

| | | |
|---|---|---|
| JP | 3240362 B2 | 12/2001 |
| JP | 3956543 B2 | 8/2007 |
| JP | 5920897 B2 | 5/2016 |
| JP | 2017-122775 A | 7/2017 |

\* cited by examiner

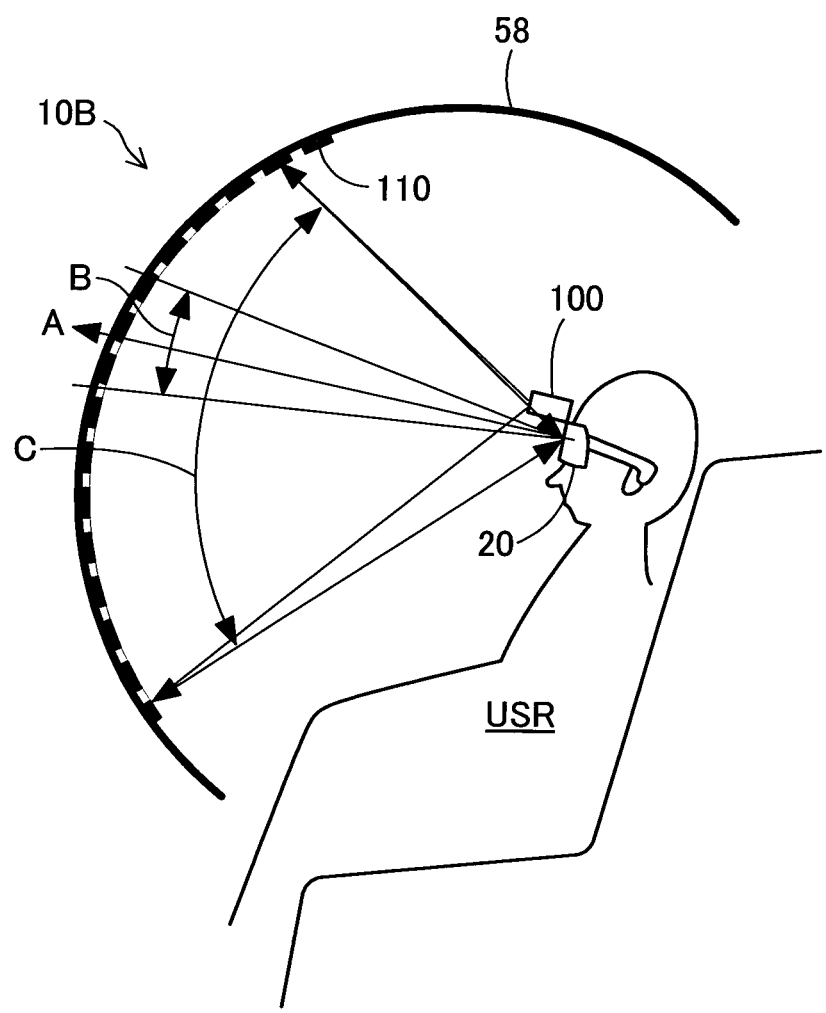

IMAGE DISPLAY DEVICE USING RETINAL SCANNING DISPLAY UNIT AND METHOD THEREOF

BACKGROUND

Field

The present invention relates to an image display technology which uses a retinal scanning display unit.

Related Art

Conventionally, various display devices are developed which cover the field of view of a person (hereinafter referred to as a user) as much as possible so as to enhance the sense of immersion of the user. For example, in Patent Literature 1, a plurality of large display devices are prepared and arranged so as to surround the user, and thus the sense of immersion is enhanced. In the configuration of the devices described above, distances between display devices such as liquid crystal displays and the user are decreased, and thus it is possible to cover a large part of the field of view even with relatively small display devices. However, when the distances to the display devices are decreased, realism is apt to lost. Hence, a configuration is required in which a certain distance from the user is acquired and in which a large screen display is produced. For example, Patent Literature 2 proposes a configuration with a high sense of immersion in which a projection display device and a curved projection surface are utilized so as to cover a large part of the field of view of the user.

On the other hand, various technologies are proposed in which as in a head-mounted display, a display device is arranged close to the eyes so as to increase the rate of coverage of the field of view, and the image that is formed is a virtual image, so as to move the position of the image away from the user. Thus, both a reduction in the size of the display device and the facilitation of a sense of immersion are achieved (for example, Patent Literature 3).

Furthermore, a technology is proposed in which in the large display device or the head-mounted display described above, consideration is given to the fact that human visibility is high in the center part of the field of view and is low in the peripheral parts thereof, and the resolution of an image displayed on the peripheral is rougher than one in the center of the field of view, and in which thus, for example, the burden of image formation and rendering time are reduced (Patent Literatures 4 and 5). Among head-mounted displays, in addition to the type in which, as illustrated in Patent Literature 3, an image is displayed on a small display unit of liquid crystal, organic EL or the like, and in which an optical system is used to make the user visually recognize this image as a virtual image, a type is also known in which an optical system is used to directly apply a small amount of laser light onto the retinas, so as to display an image capable of being focused on a position by a predetermined distance away from the user (for example, Patent Literature 6).

[Patent Literature 1] Japanese Patent No. 2708189
[Patent Literature 2] Japanese Patent No. 3956543
[Patent Literature 3] Japanese Patent No. 5920897
[Patent Literature 4] Japanese Patent No. 3240362
[Patent Literature 5] Japanese Patent No. 3143558
[Patent Literature 6] Japanese Unexamined Patent Application Publication No. 2017-122775

SUMMARY

However, in such conventional display devices, the contradictory requests below have not been satisfied. In other words, it was difficult to achieve both a reduction in the size of the device and the acquisition of natural visibility of the real world. For example, in the methods disclosed in Patent Literatures 1, 2 and 5, the size of the display device is increased. On the other hand, although in the head-mounted displays disclosed in Patent Literatures 3, 4 and 6, it is possible to achieve a reduction in the size of the device and the acquisition of a sense of immersion, the full field of view is covered, and thus regardless of whether the drawing range an image is broad, it is difficult to visually recognize the real world.

The present invention is made in view of the foregoing problems, and is able to be realized in the following aspects.

As one aspect, an image display device is provided which displays a predetermined image for a user such that the user is able to visually recognize the predetermined image. The image display device includes a retinal scanning display unit scanning, with laser light, the positions of the retinas of eyes of the user so as to display a first image that is focused on a position away from position of the eyes of the user by a first distance, the user wear the retinal scanning display unit to a head; a line-of-sight detection unit detecting the positions of a pupils of and a direction of a line of sight of the user who wears the retinal scanning display unit, a panel display unit displaying a second image different from the first image on a panel that is provided in a position away from the user by a second distance shorter than the first distance, and an image output unit outputting, as the first image to the retinal scanning display unit, a part that is assumed from the predetermined image to be present in the detected direction of the line of sight of the user, and outputting, as the second image, to the panel display unit, an image complementary to the first image for the predetermined image.

In the image display device described above, the predetermined image displayed for the user is set to the first image, which is the part that is assumed to be present in the detected direction of the line of sight of the user, and the second image, which is complementary to the first image; then the first image is displayed with the retinal scanning display unit in the position away from the user by the first distance and the second image is displayed on the panel display unit provided in the position away from the user by the second distance shorter than the first distance. Hence, the user sees the first image, which is in the direction of the line of sight and which is focused on the position away from the user by the first distance, and simultaneously sees the second image complementary to the first image away from the user by the second distance shorter the first distance. The eyes of a person have a high recognition ability in the direction of the line of sight, that is, in central vision regions. Hence, the user is able to see the first image in the focused position as a clear image, and combines this image with the complementary second image so as to be able to see the predetermined image displayed in the broad range.

In addition thereto, the present invention is able to be practiced in various aspects such as an image display method, a method of controlling an image display device, a game machine which incorporates the image display device described above, a large-scale monitor device, and the like.

BRIEF DESCRIPTION OF THE DRAWINGS

FIG. 9 is an explanatory drawing illustrating a third embodiment.

DETAILED DESCRIPTION

A. Hardware Configuration of the Embodiments

Figure 1:
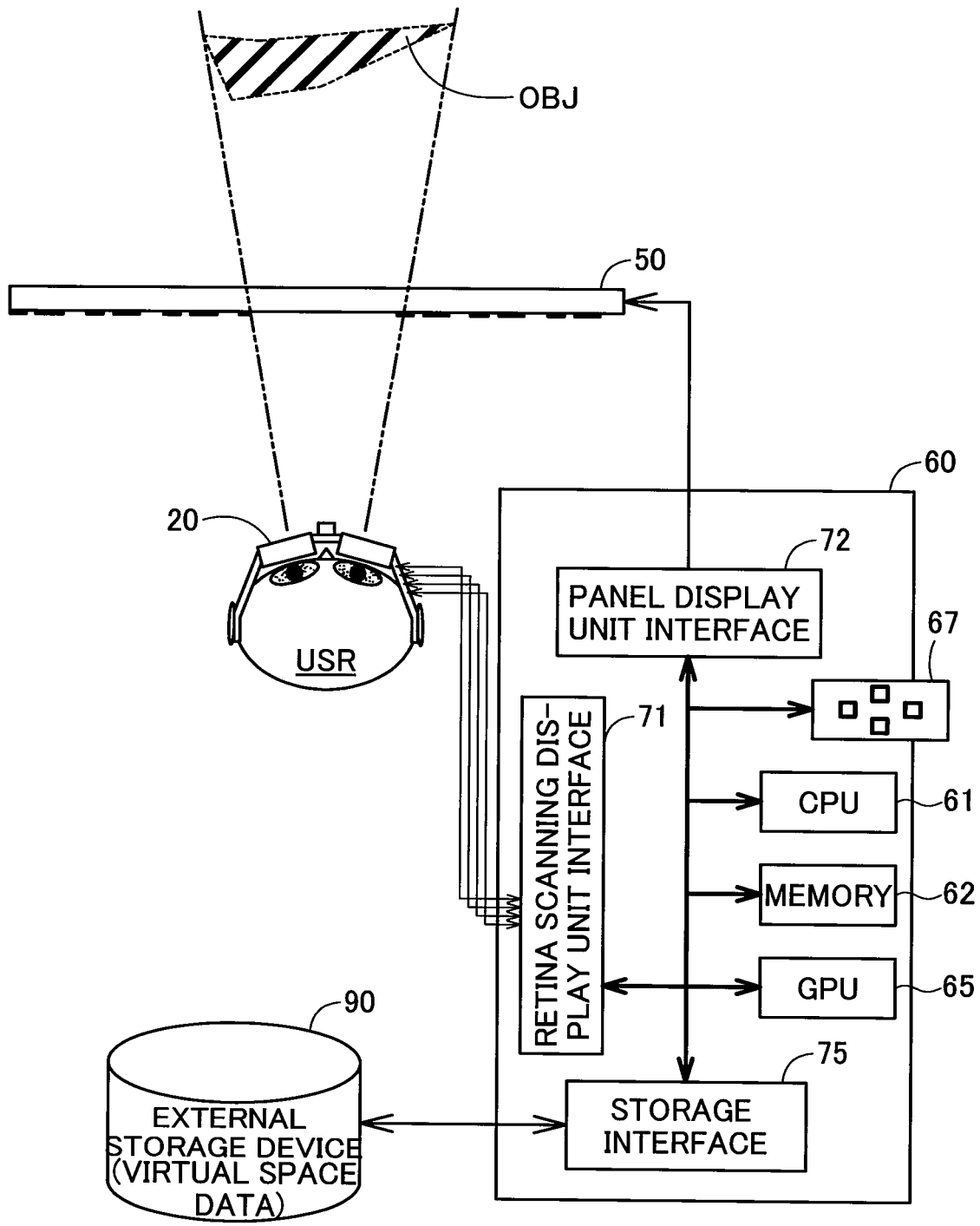
FIG. 1 is a schematic configuration view of an image display device in a first embodiment.

An image display device 10 of a first embodiment includes, as shown in FIG. 1, a retinal scanning display unit 20 which is fitted to the head of a user USR, a panel display unit 50, an image output device 60 which outputs image data that should be displayed on the retinal scanning display unit 20 and the panel display unit 50, and an external storage device 90 which stores virtual space data that is source data to be processed with the image output device 60 for display.

The image output device 60 includes a CPU 61 which organizes control, a memory 62, a GPU 65 which is a dedicated chip for performing image processing, an operation unit 67, a retinal scanning display unit interface 71 which exchanges signals with the retinal scanning display unit 20, a panel display unit interface 72 which exchanges signals with the panel display unit 50, a storage interface 75 which exchanges signals with the external storage device 90, and the like. The image output device 60 not only functions as an image output unit, but also handle a part of the functions of a line-of-sight detection unit as will be described later.

Although the operations and the like of the individual units will be described later, a brief description will be given of the image processing as a whole. The image display device 10 of this embodiment extracts the data of a space specified by the user USR from the virtual space data stored in the external storage device 90 through the storage interface 75, and converts, by utilization of the image conversion ability of the GPU 65, this data into an image which is seen from the user USR based on the position of and the direction of the line of sight of the user USR. The image conversion is performed in real time in response to the operation of the operation unit 67 by the user USR or a change in the line-of-sight direction of the user USR. The image output device 60 divides the converted image so as to output a part thereof to the retinal scanning display unit 20 through the retinal scanning display unit interface 71 and to output the remaining part to the panel display unit 50 through the panel display unit interface 72, and displays them on the display units 20 and 50. Since the image displayed on the panel display unit 50 is the remaining part of the image displayed with the retinal scanning display unit 20, both the images may be referred to as complementary images.

The virtual space data stored in the external storage device 90 is data which expresses a virtual three-dimensional space, and which serves as the source of the image display. The virtual space data described above may be data based on a real terrain or city or the like or may be entirely virtual data which is used in a game or the like. The virtual space data may include data which indicates the three-dimensional data and the coordinate relationship of objects that are present in the virtual space thereof, or data which indicates the colors, the textures, and the like of the objects. The external storage device 90 may be incorporated in the image output device 60 or may be provided in another site or the like which is connected through a network. Although in the present embodiment, the virtual space data is previously prepared, the virtual space data may be generated in real time by provision of modeling rules of the space or the imaging data of a three-dimensional camera may be utilized.

With the assumption that the user USR is present within the virtual space described above, images are generated and displayed with the image output device 60. The first position (default position) within the virtual space may be previously determined or may be specified by the user USR with the operation unit 67. As will be described later, the direction of the line of sight of the user is detected with the retinal scanning display unit 20. Only with the retinal scanning display unit 20 is it impossible to provide, to the image output device 60, a change in the position of the user, that is, a change in the position such as moving forward or turning in the virtual space. Hence, the user USR operates the operation unit 67 so as to input a change in the position of the user. Preferably, for example, a cross key which corresponds to forward, backward, leftward and rightward movements is provided in the operation unit 67, a joystick is provided, or a two-dimensional touch pad is provided, and thus the input of the direction of movement of the user USR is received.

Figure 2:
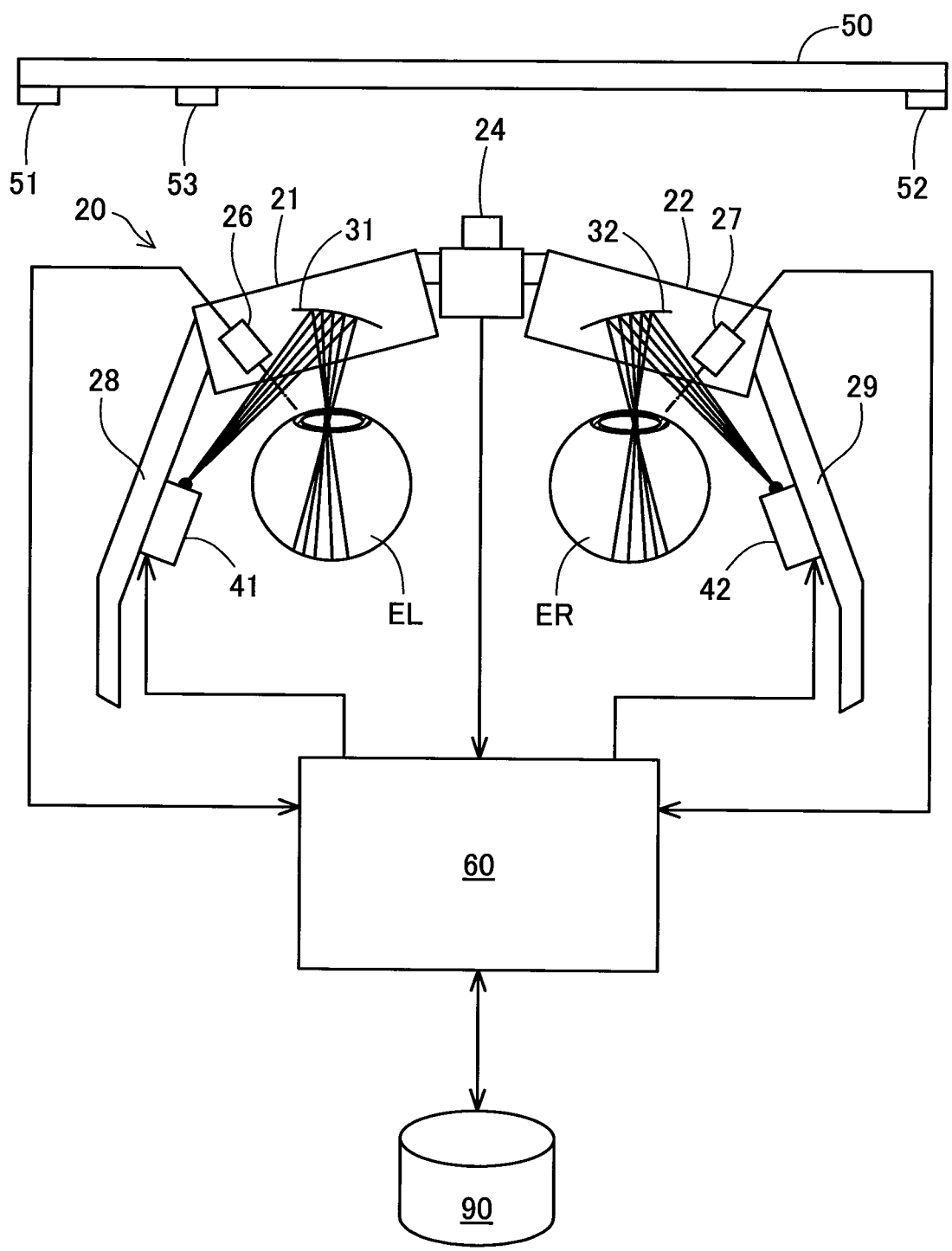
FIG. 2 is a schematic configuration view showing the center of a retinal scanning display unit.

The configuration and the function of the retinal scanning display unit 20 will be described. FIG. 2 is a schematic configuration view of the retinal scanning display unit 20. The retinal scanning display unit 20 is a so-called "see-through type" display unit, and the user USR is able to visually recognize the external world even in a state where the retinal scanning display unit 20 is fitted to the user USR. The retinal scanning display unit 20 includes a video camera 24 in the center thereof, and includes display configurations on the left and right sides thereof such that they are arranged substantially symmetrically. In the retinal scanning display unit 20, not only see-through type transparent display units 21 and 22 and temples 28 and 29 for fitting to the head by means of the user USR, but also eye cameras 26 and 27 which detect the directions of the left and right eyeballs EL and ER, reflection units 31 and 32 which are provided within the transparent display units 21 and 22, optical engines 41 and 42 which emit laser light toward the reflection units 31 and 32, and the like are provided symmetrically in a left/right direction.

The optical engines 41 and 42 incorporate semiconductor lasers which emit light in three colors RGB, and use optical multiplexers so as to integrate the light RGB from the semiconductor lasers on one optical waveguide. The light emitted from the optical waveguides is reflected off reflectors so as to be guided to the reflection units 31 and 32. The angles of the reflectors are changed with actuators such that the emitted laser light is scanned, then the output intensities of the semiconductor lasers are controlled according to the scanning, and thus images are directly formed on the retinas of the left and right eyes EL and ER of the user USR, with the result that the user is made to visually recognize them. Although the semiconductor lasers, the optical multiplexers, the optical waveguides, the reflectors, and the like incorporated in the optical engines 41 and 42 are not particularly illustrated, the structures thereof are described in detail in International Publication No. WO2015/170505 and the like. In the first place, it is possible to adopt a configuration in which, without use of the optical multiplexers, the laser light of the three primary colors is individually emitted to the reflection units with the reflectors. Alternatively, the optical engines 41 and 42 may be provided outward with respect to the transparent display units 21 and 22, and without use of the reflection units 31 and 32, the emitted laser light may directly apply to the left and right eyes EL and ER.

Although the images displayed on the retinal scanning display unit 20 will be described in detail later, the images formed with the laser light emitted from the optical engines 41 and 42 are those in the central vision regions of the retinas of the left and right eyes EL and ER. The central vision region is a region which includes at least the fovea centralis of the retina of a person. The eye of a person has a high recognition ability in the central vision region. Hence, the images formed with the optical engines 41 and 42 are clearly recognized. Since the distance between both the eyes of the user USR and the like differ depending on the individual, when the retinal scanning display unit 20 is fitted to the head of the user USR, the alignment of the optical system is adjusted such that the laser light reflected off the reflection units 31 and 32 reaches the central vision regions of the retinas. As will be described later, parallax for stereoscopic view is provided by the optical engines 41 and 42 to the images generated for the left and right eyes EL and ER, and thus the so-called focus of the eyes of the user USR is adjusted to a position corresponding to the parallax in response to parallax information included in the left and right images. Hence, objects which are present in positions other than the position described above, for example, objects which are seen through the transparent display units 21 and 22, are not normally focused, and thus they are blurred. This point will also be described in detail later.

Figure 3:
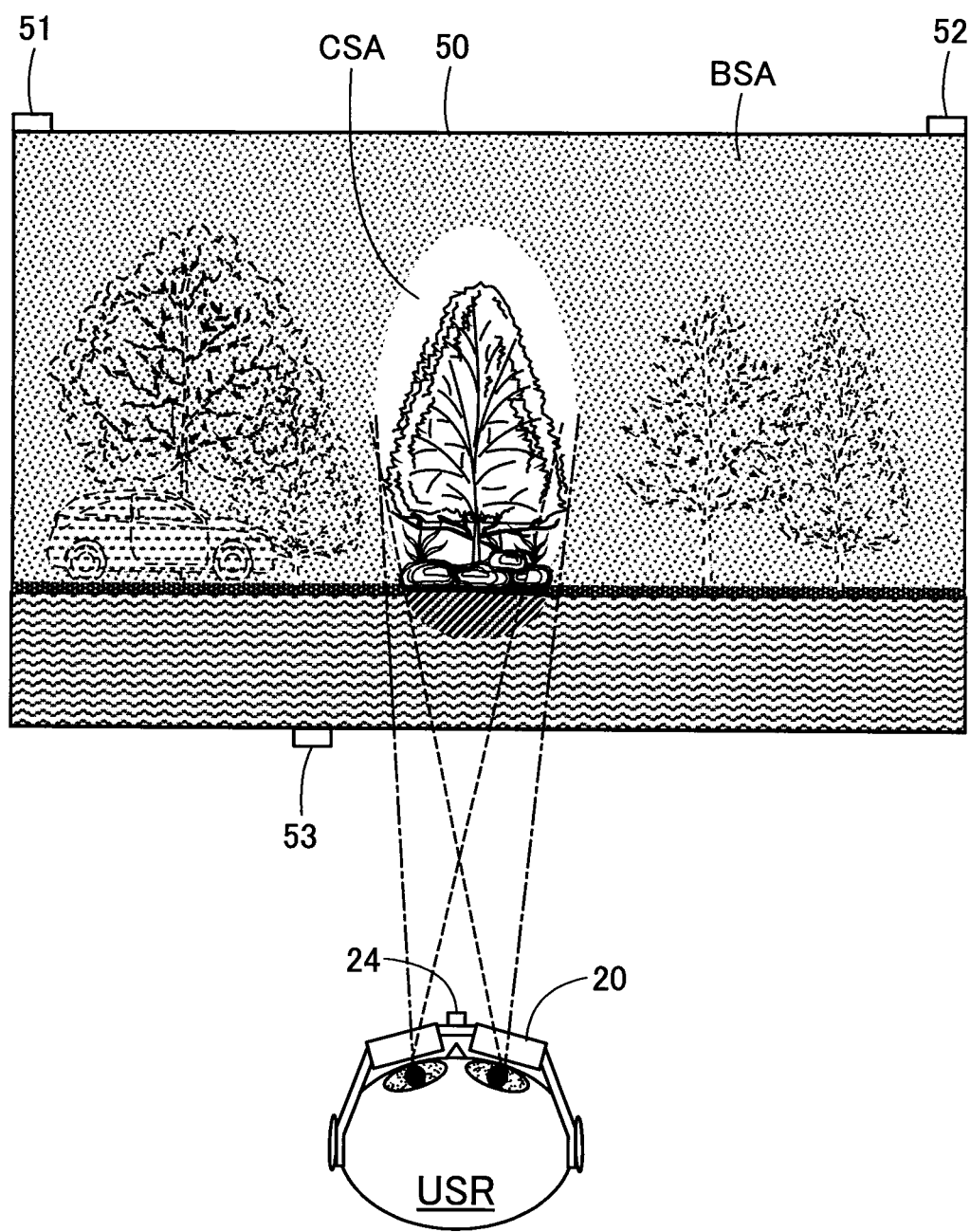
FIG. 3 is an illustrative view showing an example of an image which is seen from a user in the embodiment.

The video camera 24 provided in the center of the retinal scanning display unit 20 images the frontward area of the user USR so as to form an image, and outputs the image signals thereof to the image output device 60. The video camera 24 is provided in order to recognize three markers 51 to 53 which are provided in the panel display unit 50 placed in front of the user USR. As shown in FIG. 2 and FIG. 3 which will be described later, the markers 51 to 53 are provided in three parts of a frame which forms the outer edge of the panel display unit 50. As long as the positions of the three markers satisfy conditions in which two or more markers are prevented from being present in the same position, the three markers are prevented from being aligned on one straight line, and the three markers are in the imaging range of the video camera 24, the position relationship thereof is not limited. In the present embodiment, as shown in FIG. 3, the markers are individually provided in an upper left part, an upper right part and a lower left part of the panel display unit 50.

The image output device 60 analyzes the positions of the markers 51 to 53 based on a picture from the video camera 24 so as to be able to identify the position relationship between the retinal scanning display unit 20 and hence the user USR and the panel display unit 50. In a case where a method of using the video camera 24 so as to image the markers 51 to 53 is adopted, when the positions of the markers 51 to 53 (the distances between the markers and the arrangement thereof) are known, the picture which is obtained by imaging with the video camera 24, and which includes the markers 51 to 53, is analyzed, and thus it is possible to determine the position relationship between the retinal scanning display unit 20 and the panel display unit 50 (the distance to the panel display unit 50 and the postures of the retinal scanning display unit 20 in three directions with respect to the panel display unit 50). Processing for determining the position relationship described above may be performed on the side of the retinal scanning display unit 20. Instead of the video camera 24, a three-axis gyro sensor may be provided so as to detect the inclination of the head of the user USR and hence the inclination of the retinal scanning display unit 20, and the result thereof may be output to the image output device 60. Preferably, since in this case, the distance between the panel display unit 50 and the retinal scanning display unit 20 is not determined, a default position is determined, and this is used as the initial value. The position relationship described above may be expressed in the Cartesian coordinate system of XYZ or may be expressed in a polar coordinate system in which any position of the head of the user USR is set to the origin point.

The eye cameras 26 and 27 image the left and right eyeballs EL and ER of the user USR, and output the signals thereof to the image output device 60. The image output device 60 analyzes the positions and the sizes of the pupils of the eyeballs from the received images, and thereby recognizes the positions of the eyeballs, that is, the direction of the line of sight. The direction of the line of sight in this case is a direction with respect to the head of the user USR. Hence, the image output device 60 uses both the information of the direction of the line of sight obtained by analyzing the signals from the eye cameras 26 and 27 and the information of the position relationship of the user USR obtained by analyzing the signals from the video camera 24 described above so as to be able to identify the direction in which the user USR is looking. The "direction in which the user is looking" here is in actuality a direction with respect to the panel display unit 50, and is a direction in which the user USR is looking within the virtual space. As described above, in the present embodiment, the line-of-sight detection unit is realized with the eye cameras 26 and 27 and processing (FIG. 4, step S130) which will be described later, and which is executed in the image output device 60.

B. Image Display Processing

Figure 4:
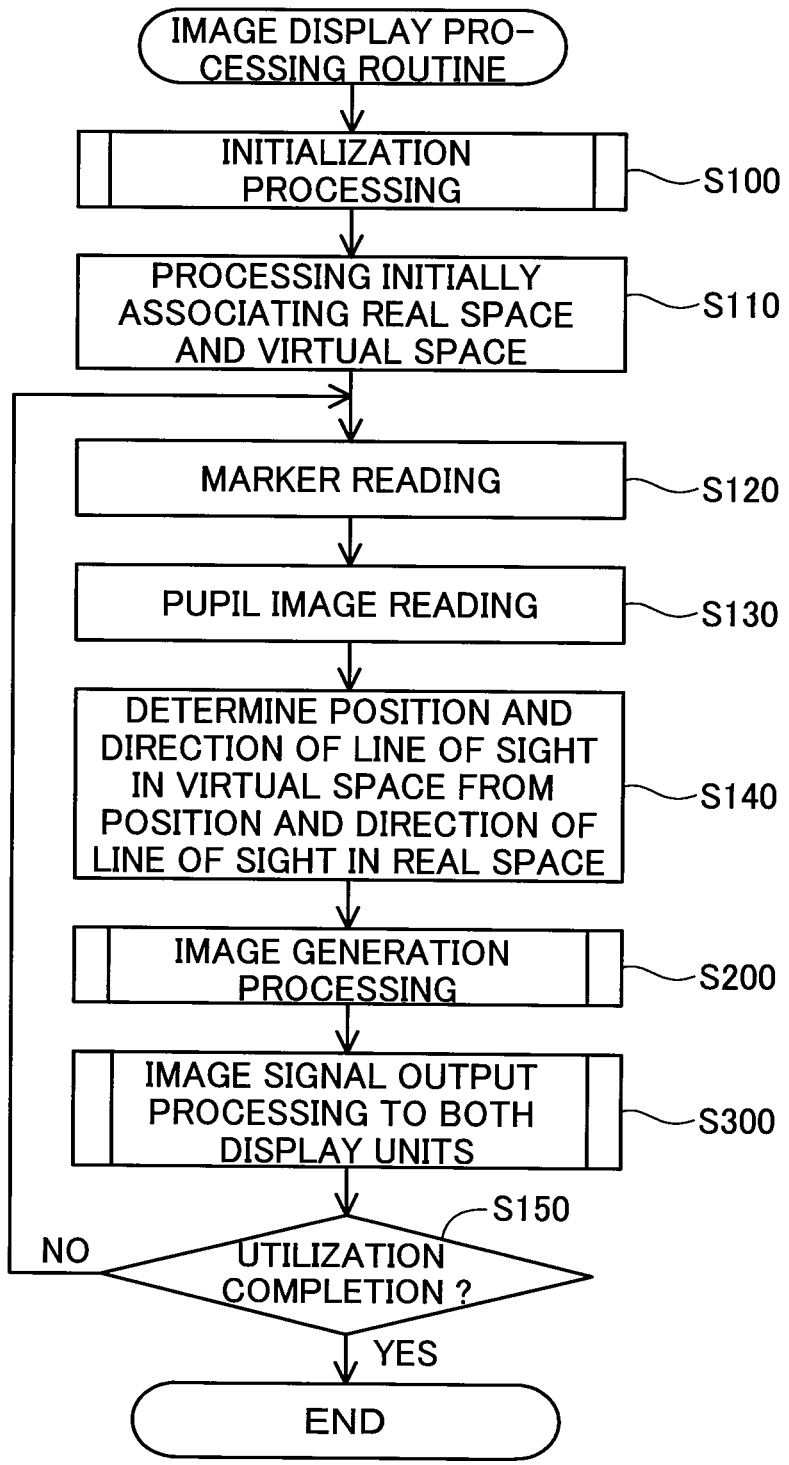
FIG. 4 is a flowchart showing an image display processing routine which is executed in an image output device.
Figure 5:
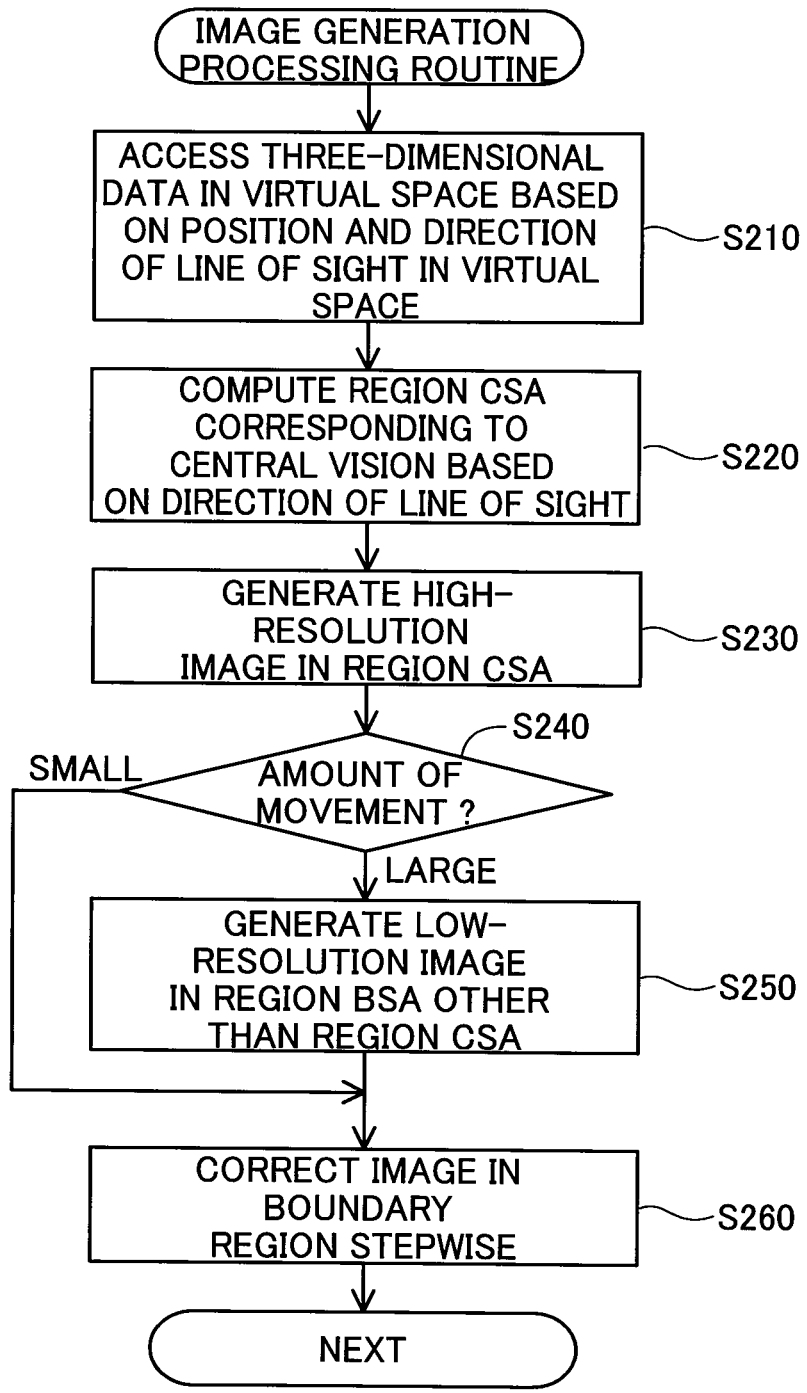
FIG. 5 is a flowchart showing an image generation processing routine which is executed in the image output device.

With the configuration described above, image display processing which is performed with the image display device 10 will be described with reference to FIGS. 3 to 5. FIG. 3 is an illustrative view showing an example of the image which is seen from the user USR in the present embodiment, and FIGS. 4 and 5 are flowcharts showing processing routines which are executed in the image output device 60. Before the description of the processing executed in the image output device 60, a description will be given of what kind of picture the user USR sees. The user USR who wears the retinal scanning display unit 20 and who stands in front of the panel display unit 50 sees an image which is displayed with the retinal scanning display unit 20 and which serves as a first image, and an image which is able to be recognized through the transparent display units 21 and 22 of the retinal scanning display unit 20, which is displayed on the panel display unit 50 and which serves as a second image. The image displayed with the retinal scanning display unit 20 and the image displayed on the panel display unit 50 are separately generated as will be described later.

Of the two images, the image displayed on the retinal scanning display unit 20 is, as shown in FIG. 3, the image of a region (hereinafter referred to as a central region) CSA corresponding to the central vision for the user USR. Since no image other than the image of the central region CSA corresponding to the central vision is output to the retinal scanning display unit 20, no image is present in any region other than the central region CSA, and thus for the user USR, the regions other than the central region CSA are in a see-through state. An image in the region (hereinafter referred to as a peripheral region) BSA which is a region other than the central region CSA, and which overlaps the display region of the panel display unit 50, is output to the panel display unit 50. Since the two images do not overlap each other, they are in a complementary relationship. Hence, the user USR visually recognizes the image of the central region CSA displayed on the retinal scanning display unit 20 and the image of the peripheral region BSA displayed on the panel display unit 50 as an image which is continuous, and which is free of contradiction and congestion.

While the user USR is seeing the image, the video camera 24 provided in the retinal scanning display unit 20 continuously performs imaging, that is, images the markers 51 to 53 illustrated in FIG. 3. Hence, the image output device 60 recognizes the markers 51 to 53 which are imaged so as to be able to find the position relationship between the user USR and the panel display unit 50 with the panel display unit 50 serving as the starting point of the coordinate system, that is, the distance and the inclination (the posture of the head of the user USR) of the retinal scanning display unit 20. Moreover, the signals from the eye cameras 26 and 27 provided in the retinal scanning display unit 20 are input to the image output device 60, and thus the image output device 60 is able to find, from the images of the pupils of the left and right eyes EL and ER of the user USR, the positions of the pupils and the direction of the line of sight with the head of the user USR serving as the starting point of the coordinate system. Hence, the image output device 60 utilizes both the recognition results so as to be able to find in what posture the user USR is in with respect to the panel display unit 50 and in which direction the user USR is looking. Although in the present embodiment, the line-of-sight detection unit detects the direction of the line of sight by the method of determining the positions of the pupils and the direction of the line of sight from the images of the pupils obtained by imaging with the eye cameras 26 and 27, the positions of the pupils may be directly detected with dedicated sensors or the like, and thus the direction of the line of sight may be determined by calculation.

An image display processing routine and an image generation processing routine which are executed with the image output device 60 will now be described with reference to the flowcharts shown in FIGS. 4 and 5. When the power is turned on, and the user USR wears the retinal scanning display unit 20, the image output device 60 of the image display device 10 executes the image display processing routine shown in FIG. 4. When this processing routine is started, the CPU 61 of the image output device 60 first executes the initialization processing (step S100). Initialization processing refers to the processing necessary for the acquisition of memory space used in the image processing, the settings of the GPU 65 and the exchange of signals and data with the retinal scanning display unit 20, the panel display unit 50 and the external storage device 90. It is assumed that the alignment of the optical system of the retinal scanning display unit 20 fitted to the head of the user USR has been adjusted and that the images from the retinal scanning are formed in the appropriate positions of the eyes of the user USR.

After the completion of the initialization processing, the CPU 61 performs processing which initially associates a real space and the virtual space with each other (step S110). In this processing, the part of the virtual space in which the user USR is located and the direction the user USR faces are set, and the real space in which the user USR is present while wearing the retinal scanning display unit 20 and the virtual space which is stored in the external storage device 90 are associated with each other. The part of the virtual space in which the user USR is located and the direction in which the user USR faces may be previously determined as a default position and a default direction or may be set by the user USR with the operation unit 67. In such a case, an initial position and an initial direction are previously provided, and then the operation unit 67 is operated to perform the association. In the first place, when the user USR commences use of the image display device 10, their position and direction within the virtual space are specified, for example, in a form such as: "The user USR stands at xx place in ○○ world so as to face east", and thus the position and the direction may be associated with the real space of the user USR. The position and the direction may be specified by utilization of, for example, voice recognition, or may be specified by being displayed a map or the like and specifying a point on the map and a direction.

Then, the image output device 60 performs processing which exchanges signals with the retinal scanning display unit 20 and which reads the markers 51 to 53 provided in the panel display unit 50 from the picture obtained by imaging with the video camera 24 of the retinal scanning display unit 20 (step S120). Furthermore, the image output device 60 performs processing which inputs signals from the eye cameras 26 and 27 of the retinal scanning display unit 20 and which reads the images of the pupils (step S130). The image output device 60 is able to find, from these two pictures, the position of and the direction of the line of sight in the real space of the user, that is, how far the user USR is with respect to the panel display unit 50 and which part of the panel display unit 50 the user USR sees, and thus the image output device 60 is able to determine from which position and in which direction the user USR is looking in the virtual space associated (step S140).

Based on the association described above, the image output device 60 then performs image generation processing (step S200) and processing which outputs the image signals to both the display units 20 and 50 (step S300). Thereafter, whether or not the utilization of the image display device 10 by the user USR is completed is determined (step S150), and when the use is not completed, the process returns to step S120, and the process is repeated from the reading of the markers 51 to 53. Hence, when the user USR changes their position with respect to the panel display unit 50 or changes the direction in which they are looking, for example, processing is continued, which changes the size of the image according to the change of the position with respect to the panel display unit 50, such as moving close thereto or moving away therefrom. It is possible to easily realize the start and the completion of the use of the image display device 10 with the switch provided in the operation unit 67 or the like.

The image generation processing (step S200) in FIG. 4 will be described with reference to FIG. 5. When the image generation processing routine is started, the CPU 61 first performs processing which accesses, based on the current position of the user USR in the virtual space and the direction of their line of sight, the three-dimensional data of the virtual space stored in the external storage device 90 so as to read it (step S210). Then, based on the three-dimensional data which is read and the current direction of the line of sight of the user USR, the central region CSA corresponding to the central vision of the user USR is computed (step S220). The computation of the central region CSA corresponds to the determination of the center position of the central region CSA and the size thereof. With respect to the size, in the present embodiment, the shape of a predetermined ellipse or oval is defined, and the size is defined as, for example, a minor radius and a major radius.

Thereafter, for the determined central region CSA, the CPU 61 instructs the GPU 65 to generate a high-resolution image (step S230). Since the position of and the direction of the line of sight of the user USR in the virtual space are determined in step S130 of FIG. 4, it is easy to generate an image corresponding to the central region CSA in accordance with this. Here, the GPU 65 converts, based on the three-dimensional data of the virtual space, a three-dimensional depth within the virtual space into the parallax of the images formed on both the eyes EL and ER, and separately generates the images for both the eyes EL and ER. The resolutions of the generated images are set by providing, to the GPU 65, parameters when the three-dimensional data serving as the source of the images is subjected to rendering. Since the central region CSA is narrower than the peripheral region BSA around the central region CSA, the GPU 65 is able to generate high-resolution images for both the eyes corresponding to the central region CSA for a short period of time. The images are rewritten at a rate of about 60 frames per second, and thus the user USR is assumed to see pictures (moving images). The method of rewriting the images may be interlaced or non-interlaced.

Then, the CPU 61 determines whether the amount of movement of the line of sight of the user USR is large or small (step S240). The amount of movement of the line of sight is able to be grasped as an amount θ of variation of the angle of the line of sight from a direction when the high-resolution image is generated immediately before. In a case where the amount of movement is large, namely the angle 9 is equal or larger than a predetermined level and in a case where an image is generated for the first time, processing which generates a low-resolution image is performed on a peripheral region BSA other than the central region CSA (step S250). Furthermore, processing which corrects the image stepwise is performed on a boundary region between the central region CSA and the peripheral region BSA (step S260). Specifically, it is possible to realize this processing by gradually lowering the resolution of the periphery of the central region CSA toward the outside. As for the processing which lowers the resolution, various types of methods, such as the nearest neighbor method, the bilinear method and the high cubic method are known. Any one of these methods is preferably applied. Simply stated, the gradation values of two or more pixels adjacent to each other are replaced by the average gradation value of the pixels.

On the other hand, when the amount of movement of the line of sight is determined to be small, namely the angle θ is smaller than the predetermined level (step S240), an image is not newly generated in the peripheral region BSA, and only the correction of the resolution of the boundary region is performed (step S260). In either of the cases, the present processing routine is completed.

As described above, the generation of the high-resolution image in the central region CSA (step S230) and the generation of the low-resolution image in the peripheral region BSA (step S250) are performed, and thereafter the processing in step S300 shown in FIG. 4, that is, the processing which outputs the image signals to the retinal scanning display unit 20 and the panel display unit 50 is performed.

Hence, as shown in FIG. 3, in the central region CSA, the user USR is able to visually recognize the high-resolution image displayed with the retinal scanning display unit 20. Moreover, here, in the images generated on the retinas of the left and right eyes, a parallax corresponding to the depth is provided, and thus the user USR three-dimensionally recognizes, in the central region CSA, an image with a depth, that is, the virtual space.

Figure 6:
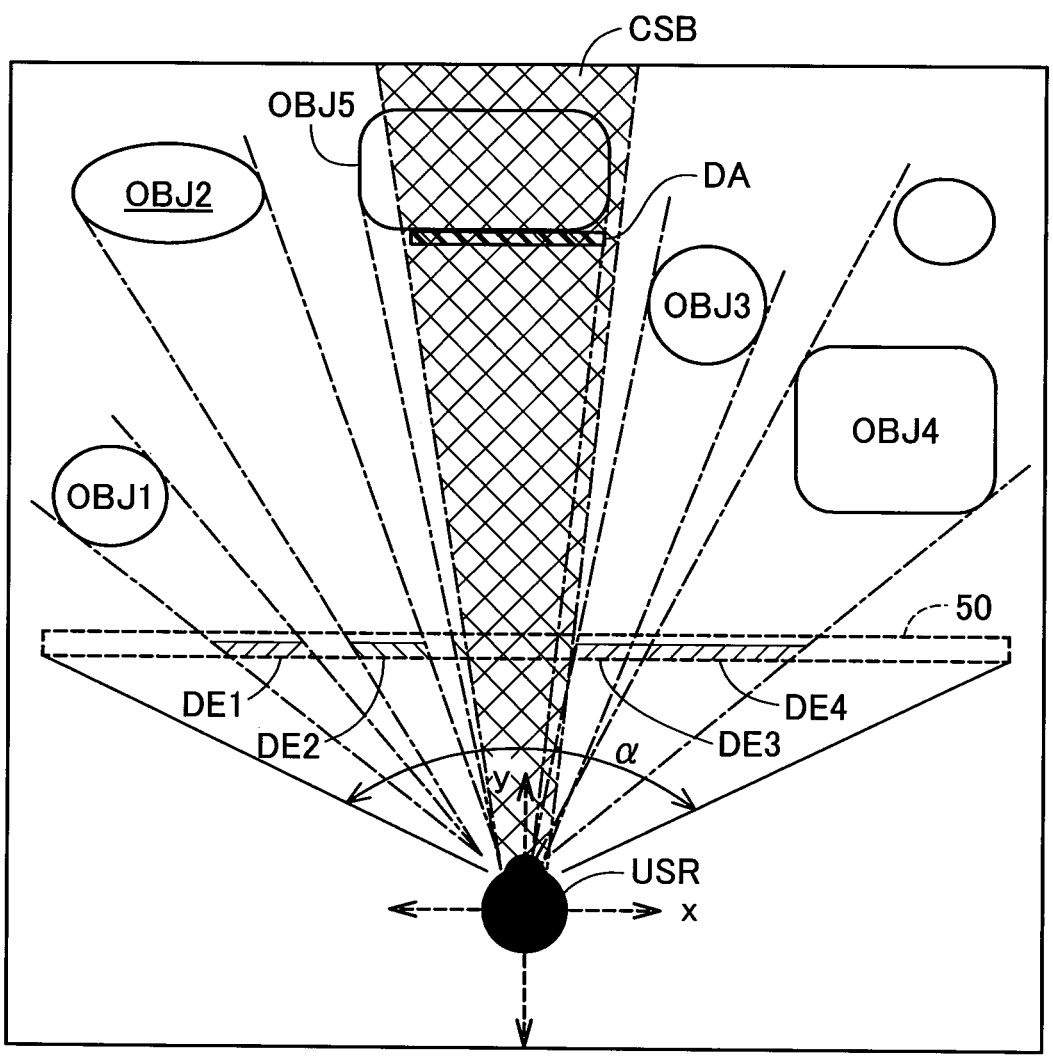
FIG. 6 is an explanatory drawing schematically showing the way the user sees things.

This state is illustrated in FIG. 6. It is now assumed that in the virtual three-dimensional space, objects OBJ1 to OBJ5 are present. It is assumed that the user USR located slightly away from the panel display unit 50 faces the object OBJ5 in the virtual space. Here, the image output device 60 recognizes the position of and the direction of the line of sight of the user USR so as to display an image corresponding to the central region CSA on the retinal scanning display unit 20. In FIG. 6, a range CSB which corresponds to the central region CSA and which is seen from the user USR is cross-hatched.

The image output device 60 assumes that the user USR sees the cross-hatched range CSB, generates an image when the range CSB is seen from the side of the user USR and displays this image with the retinal scanning display unit 20. Since this image includes the parallax information, the user USR visually recognizes the image when the object OBJ5 is seen from the side of the user USR, and visually recognizes the image due to the parallax included in the image such that the object OBJ5 is present in a position DA away from the user USR. Here, on the panel display unit 50, an image corresponding to the object OBJ other than the image of the left side region which is not in the central region CSA is not formed.

On the panel display unit 50, an image of the peripheral region BSA complementary to the central region CSA is formed. It is assumed that the objects OBJ1 to OBJ4 are seen from the user USR, and accordingly, the positions of formation of this image are the positions DE1 to DE4 of the panel display unit 50. When it is assumed that the size of the panel display unit 50 is, for example, a liquid crystal display device of 48 inches with an aspect ratio of 16 to 9, if the user USR stands in a place 50 centimeters away from the center of the panel display unit 50, the user USR is able to see the image on the panel display unit 50 within a range of a total of 94 degrees, that is, 47 degrees on the left side and 47 degrees on the right side in a horizontal direction. In FIG. 6, this range is indicated as an angle δ. Likewise, the user USR is able to see the image on the panel display unit 50 within a range of a total of 62 degrees, that is, 31 degrees on each of the upper and lower sides in a vertical direction. The user USR is able to visually recognize the image on the panel display unit 50 through the transparent display units 21 and 22 of the retinal scanning display unit 20. Although this image is displayed on the panel display unit 50 so as to be a low-resolution image without depth, since the user USR focuses attention on the direction of the line of sight, when the image is in a range of about the angle δ, the sense of immersion of the user USR is sufficiently high.

The left and right eyes EL and ER of the user USR are focused on positions corresponding to the depth of the virtual space according to the parallax information included in the images which are formed in the central vision of the retinas with the retinal scanning display unit 20, and thus the image of the peripheral region BSA displayed on the panel display unit 50 is not focused. In other words, the image of the peripheral region BSA is a blurred image for the user USR. In human visual recognition characteristics, the spatial resolution (visual acuity) of the field of view other than the central vision is rapidly lowered. Hence, even when the peripheral region BSA in which the image lower in resolution than the image of the central region CSA is displayed as described above is not focused, the user USR is unlikely to have an uncomfortable feeling in regards to recognition. Moreover, the image in the periphery of the central region CSA is corrected such that the resolution is changed stepwise in the boundary region between the central region CSA and the peripheral region BSA, and thus the user USR is more unlikely to have an uncomfortable feeling in regards to a difference between the images of the central region CSA and the peripheral region BSA.

When in this state, the user USR changes the direction in which they are looking, the change of the direction of the line of sight is immediately recognized with the image output device 60 as a change of the positions of the markers 51 to 53 detected with the video camera 24 and a change in the movements of the eyes EL and ER detected with the eye cameras 26 and 27. Although the direction of the line of sight may simply just be the direction in which the user USR is looking, the position of a focal point, that is, how far is the point seen by the user USR is also able to be recognized from the positions of the pupils of the left and right eyes EL and ER. The position of the focal point is recognized, and thus it is possible to adjust, according to the position of the focal point which is recognized, the parallax of the images formed on the retinas of the left and right eyes EL and ER.

Figure 7:
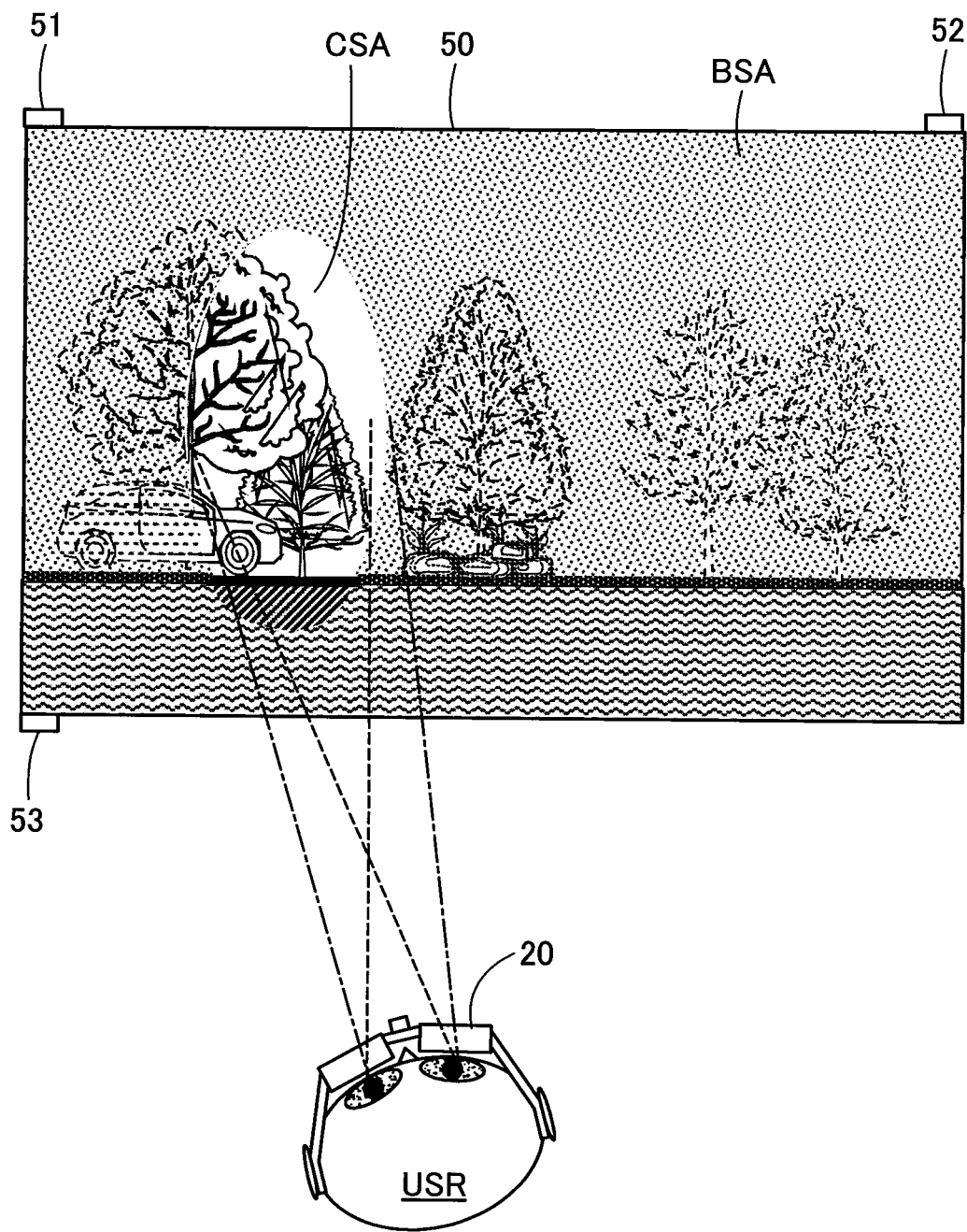
FIG. 7 is an explanatory drawing showing an example of an image which is seen by the user when the direction of the line of sight of the user is moved.

When the direction in which the user USR is looking is found, as illustrated in FIG. 7, the image displayed in the central region CSA which is displayed on the retinal scanning display unit 20 is moved in the direction in which the user USR is looking within the virtual space. The image displayed in the peripheral region BSA is formed, according to this movement, as the image complementary to the image of the central region CSA. When the central region CSA is moved, the image formed in the central region CSA is constantly a high-resolution image, and the image formed in the peripheral region BSA is constantly a low-resolution image.

As described above, in the image display device 10 of the embodiment described above, the retinal scanning display unit 20 displays, in the central region CSA in the direction of the line of sight of the user USR, an image which has a high resolution and which is stereoscopically viewed, and the panel display unit 50 displays, in the peripheral region BSA complementary to the central region CSA, an image which has a low resolution. The central region CSA is set so as to follow the direction of the line of sight of the user USR, and the image in the region is updated so as to follow this. Hence, the resolution of the image formed in the central vision of the user USR is constantly kept high, and thus the user USR is able to continue to see clear images in the virtual space, is not concerned about distortion and discontinuous parts over the wide field of view and is able to experience a natural stereoscopic view. Consequently, the user USR is able to continuously experience a high sense of immersion in the virtual space and to feel great realism.

In the image display device of the present embodiment, a large part of the line of sight of the user USR is covered with the image displayed on the retinal scanning display unit 20 and the image displayed on the panel display unit 50, and moreover, when the image which is visually recognized by the user USR with the retinal scanning display unit 20 is changed according to the change of the direction of the line of sight of the user USR, the complementary image displayed with the panel display unit 50 is also changed. Hence, the uncomfortable feeling which occurs as a result of the gap between the image that is directly displayed on the retinas of the user with the retinal scanning display unit 20 and the image that is seen by the user and that is displayed on the panel display unit 50 is reduced. With the retinal scanning display unit 20 and the panel display unit 50, it is also possible to provide a large amount of information or complicated information.

Moreover, an image visual recognition distance for the user USR is determined by the image of the central region CSA displayed with the retinal scanning display unit 20, and thus it is not necessary to increase the distance between the panel display unit 50 and the user USR. The image displayed with the panel display unit 50 constantly serves as the image of the peripheral region BSA for the user USR, and even when the distance to the panel display unit 50 is short, and the image displayed on the panel display unit 50 is not focused, the sense of immersion is not prevented. Hence, it is sufficient that the distance from the user USR to the panel display unit 50 is several tens of centimeters, and thus it is possible to reduce the size of the overall configuration including the panel display unit 50.

Moreover, since the image displayed on the retinal scanning display unit 20 is able to be set to only the image of the central region CSA, as compared with a case where all the images including the peripheral region BSA are formed, it is possible to reduce the time necessary for the generation of the image in the image output device 60 which has a high resolution and which includes the parallax information. The display region of the retinal scanning display unit 20 itself is able to be decreased in size according to the central region CSA, and thus it is possible to reduce the sizes of the optical engines 41 and 42, the reflection units 31 and 32, and the like in the retinal scanning display unit 20. Consequently, it is possible to, for example, save resources and reduce manufacturing costs.

The image which is displayed in the peripheral region BSA with the panel display unit 50 is complementary to the image displayed in the central region CSA, and has a low resolution. Hence, it is possible to reduce the time necessary for the computation of the image of a wide region. Moreover, here, as shown in FIG. 5, when the amount of movement of the line of sight is not large, the update processing of the image is not performed on the peripheral region BSA. Hence, it is possible to further reduce computation processing. When the amount of movement of the line of sight is small, since the change in the image of the peripheral region BSA is small, and the visual recognition ability of a person in a region other than the center is low, the user USR is prevented from having an uncomfortable feeling even without the update being performed.

Since the retinal scanning display unit 20 used in the image display device 10 of the present embodiment is a see-through type, the user USR sees the image displayed on the panel display unit 50 through the transparent display units 21 and 22 of the retinal scanning display unit 20. Hence, while the user USR is able to be immersed in the world of the picture displayed with the image display device 10, the visual recognition of the peripheral real world including the body of the user USR is substantially prevented from being inhibited or is completely prevented from being inhibited. It is not only possible to have a natural visual experience, but moreover, for example, when an emergency or the like occurs, and thus a person who is trying to notify the user USR of something enters the field of view, it is easy to visually recognize this through the retinal scanning display unit 20.

C. Second Embodiment

Figure 8:
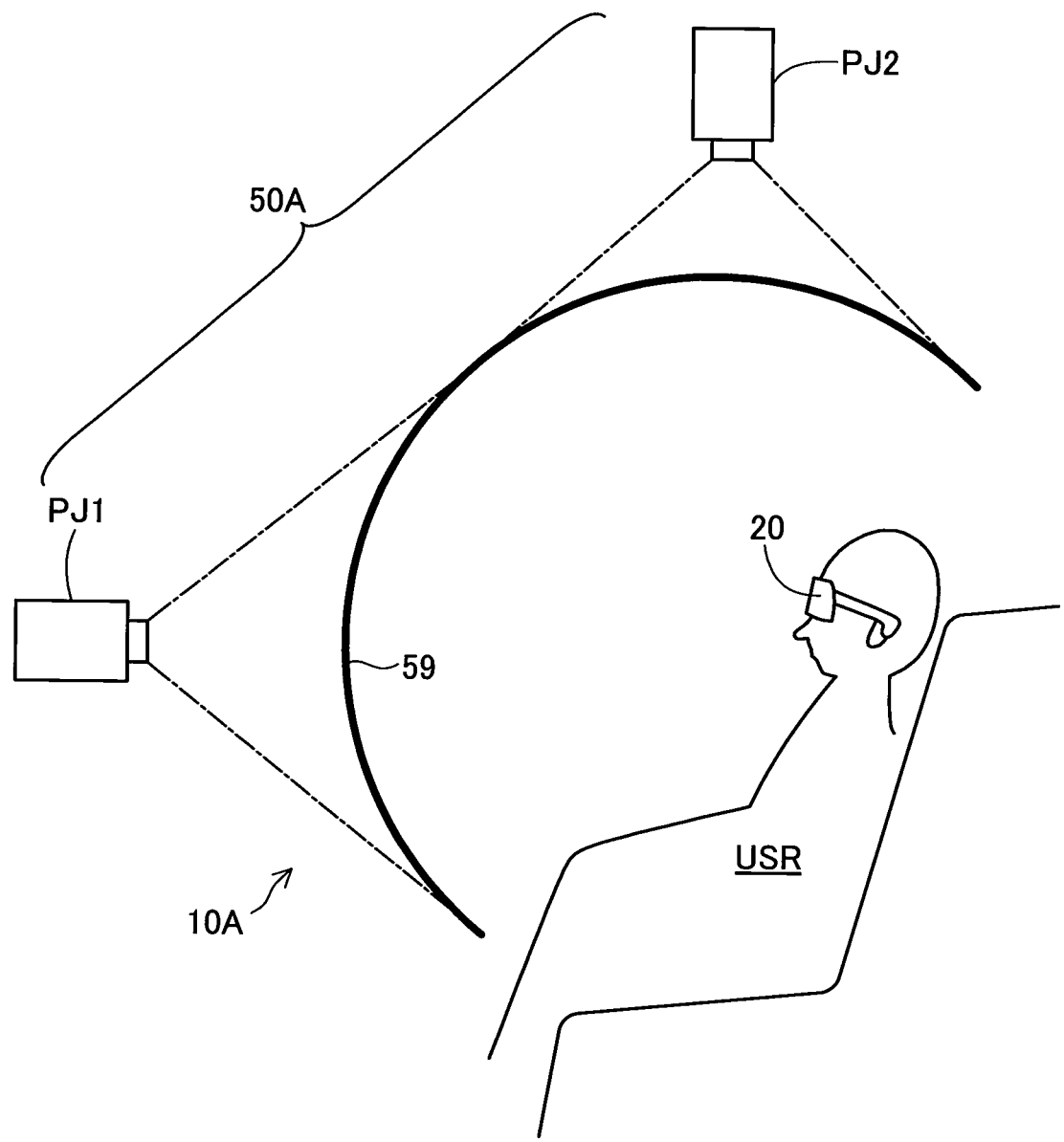
FIG. 8 is an explanatory drawing illustrating a second embodiment.

In the first embodiment, a liquid crystal display having a flat display surface was used as the panel display unit. On the other hand, as shown in FIG. 8, the image display device 10A of the second embodiment includes the same retinal scanning display unit 20 as used in the first embodiment and a panel display unit 50A which has a curved display surface. Although as the curved display described above, for example, a display such as an organic EL display which is able to form a flexible light emission surface may be utilized so as to achieve the curved display, in the second embodiment, a projection display device is used. In the second embodiment shown in FIG. 8, the user USR wears the retinal scanning display unit 20 and is located within the dome-shaped panel display unit 50A. In this embodiment, the basic configuration of the image display device 10 is the same as in the embodiment described above, and an image output device which outputs image data that should be displayed on the retinal scanning display unit 20 and the panel display unit 50A, and an external storage device which stores virtual space data that is source data to be processed with the image output device for display, are provided. The retinal scanning display unit 20 remains the same. The panel display unit 50A differs in that the panel display unit 50A is a projection type and that the display surface is dome-shaped.

The panel display unit 50A includes a plurality of projection display devices PJ1, PJ2, . . . , and projects, from the outside of a dome 59, the image output from the image output device 60. The dome 59 is a rear projection screen, and the user USR is able to see the image projected with the projection display device PJ1 and the like.

Even in the second embodiment, in the central region CSA including the central vision of the user USR, high-resolution images for stereoscopic view are formed with the retinal scanning display unit 20 on the retinas of the left and right eyes EL and ER of the user USR, and a low-resolution image is formed with the panel display unit 50A in the region (peripheral region BSA) complementary to the central region. Hence, the same effects as in the first embodiment are achieved, and moreover, the dome 59 is used, and thus it is possible to display the image so as to cover a region close to the full field of view of the user USR, with the result that it is possible to enhance the sense of immersion of the user USR. Moreover, since the image visual recognition distance for the user USR is determined by the image of the central region CSA displayed with the retinal scanning display unit 20, it is not necessary to increase the distance between the dome 59 and the user USR. The image displayed on the dome 59 with the panel display unit 50A constantly serves as the image of the peripheral region BSA for the user USR, and even when the distance to the dome 59 is short, and the image is not focused, the sense of immersion is not prevented. Hence, it is sufficient that the distance from the user USR to the dome 59 is several tens of centimeters. The size of the dome 59 is reduced as described above, and thus it is possible to reduce the number of projection display devices PJ1, PJ2, . . . which are installed, and to control display abilities such as display brightness and the like, with the result that it is possible to achieve the simplification and decrease in size of the device as a whole, including these points.

D. Third Embodiment

The third embodiment of the present invention will now be described. FIG. 9 is an illustrative view showing a schematic configuration of the image display device 10B of the third embodiment. As shown in FIG. 9, the image display device 10B includes the retinal scanning display unit 20 fitted to the head of the user USR and a panel display unit 50B. The third embodiment is the same as in the first and second embodiments in that the image output device which outputs image data that should be displayed on the retinal scanning display unit 20 and the panel display unit 50B, and the external storage device which stores virtual space data that is source data to be processed with the image output device for display, are provided.

The panel display unit SOB is configured with a projector 100 which is provided together on the head of the user USR with the retinal scanning display unit 20 and a retroreflective screen 110 which is stuck to the inner side of a spherical dome 58. The retroreflective screen 110 is a screen in which small glass beads are spread on its surface. In the glass beads, the refractive index and the diameter thereof are selected so as to produce retroreflection. As the retroreflective member using the glass beads described above, various types are known which include an exposed lens type, an enclosed lens type, a capsule lens type, and the like. In the present embodiment, since the screen is stuck to the inner side of the dome 58, a retroreflective member which is highly flexible, and which is the exposed lens type, is used. In the first place, when the retroreflective member is manufactured together with the dome 58, the retroreflective member is not limited to the exposed lens type, and it is possible to use the enclosed lens type or the capsule lens type. Alternatively, a prism type retroreflective member may be used.

The image which is displayed with the retinal scanning display unit 20 is the first image, and is, as described previously, the image of the central region CSA (see FIG. 3) corresponding to the central vision for the user USR. This image is constantly displayed in the direction A of the line of sight of the user USR. In FIG. 9, the display range thereof is indicated as a range B. In the first place, the range B is a three-dimensional range. Since an image other than the image of the central region CSA corresponding to the central vision is not output to the retinal scanning display unit 20, no image is present in the region other than the central region CSA, and thus for the user USR, the regions other than the central region CSA are in a see-through state. In the regions other than the central region CSA, the image which is projected from the projector 100 and which serves as the second image is reflected off the retroreflective screen 110 so as to enter the field of view of the user USR. In other words, the image of the peripheral region BSA is the image which is projected from the projector 100. In FIG. 9, the range of the image projected from the projector 100 is indicated as range C. The image displayed with the retinal scanning display unit 20 and the image displayed with the projector 100 do not overlap each other, so as to be complementary to each other. Hence, the user USR visually recognizes the image of the central region CSA displayed on the retinal scanning display unit 20 and the image of the peripheral region BSA which is projected from the projector 100, which is reflected off the retroreflective screen 110 and which is visually recognized, as an image that is continuous and that is free of contradiction and overlap.

Since the image display device 10B of the third embodiment uses the retroreflective screen 110 as the panel display unit SOB, a large part of light projected from the projector 100 is returned to around the head of the user USR. Hence, even a projector which produces a low output is able to serve as the panel display unit 50B so as to form a second image having sufficient brightness. Furthermore, since the projector 100 which projects the image on the retroreflective screen 110 is provided on the head of the user USR, even when the position of the head of the user USR is moved, the reflected light is efficiently collected around the head of the user USR. Hence, even when the user USR moves, it is not necessary to correct the alignment and the like.

In the third embodiment, both the retinal scanning display unit 20 and the projector 100 for the panel display unit 50B which display the images are provided together on the head of the user USR, and thus it is possible to simplify the management of the connection, information transfer and wiring of power lines, etc., to the image output device 60 and the like. On the side of the dome 58, only the retroreflective screen 110 is preferably installed, and thus it is easy to move and install the dome 58. Both the retinal scanning display unit 20 and the projector 100 are provided together on the head of the user USR, and thus it is easy to align the arrangements of the first image and the second image. If the retroreflective screen 110 is installed on the entire surface on the inner side of the dome 58 or almost the entire surface, the user USR is able to visually recognize the first and second images from the ceiling to their feet, that is, substantially over 360 degrees. When visual recognition over 360 degrees is achieved, it is possible to reduce the number of projectors 100, and depending on conditions, with only one projector 100, it is possible to achieve visual recognition over 360 degrees.

Instead of one projector 100, a plurality of projectors 100 may be arranged so as to extend the range C in which the second image is displayed. In this case, the retroreflective screen 110 within the dome 58 is preferably stuck to the interior of the dome 58 according to the extended range. The projector 100 may be integrally provided with the retinal scanning display unit 20 or may be provided separately to the retinal scanning display unit 20 with prosthetics such as a hat-shaped adapter or belt on the head of the user USR. When the projector 100 is provided close to the head, the projector 100 may be mounted on the shoulder. When the size of the projector 100 is reduced, the projector 100 may be arranged in the center of the retinal scanning display unit 20, and, for example, may be arranged side by side with the video camera 24 described in the first embodiment. The projector 100 may be incorporated in the temple 28 or 29.

In the first place, the projector 100 may be placed away from the user USR. In this case, a mechanism is preferably provided in which the movement of the head of the user USR is detected with a video camera or the like, and in which the direction of projection of the image from the projector 100 is three-dimensionally controlled according to the movement of the head. In this case, the projector 100 may directly project the second image toward the retroreflective screen 110 or may project the second image toward a convex mirror provided on the head of the user USR. In the latter case, the image which is reflected off the convex mirror is further projected toward the retroreflective screen 110. In this way, it is possible to sufficiently utilize the property of the retroreflective screen 110 in which the light is reflected in the direction of projection, and to reduce the weight of the member mounted on the head of the user USR.

Furthermore, in the third embodiment, the first image which is visually recognized by the user USR is formed with the retinal scanning display unit 20, the second image is projected with the projector 100 which is prepared for each of users USR and is reflected off the retroreflective screen 110 and substantially all of the second image is returned to the vicinity of the head of the user USR, with the result that a plurality of users USR are also able to use one dome 58 at the same time. This is because, by the property of the retroreflective screen 110, an image projected from the projector 100 on the head of a user USR who is located slightly away is hardly visually recognized by a user USR who is adjacent to the user USR.

E. Other Embodiments

In addition to the embodiments described above, as an image display device which displays a predetermined image for a user such that the user is able to visually recognize the predetermined image, it is possible to adopt the following configuration. This image display device includes: a retinal scanning display unit which is fitted to the head of the user and which scans, with laser light, the positions of retinas of the eyes of the user so as to display a first image that is focused on a position away from the position of the eyes of the user by a first distance; a line-of-sight detection unit which detects the positions of pupils of and the direction of the line of sight of the user who wears the retinal scanning display unit; a panel display unit which displays a second image different from the first image on a panel that is provided in a position away from the user by a second distance shorter than the first distance; and an image output unit which outputs, as the first image to the retinal scanning display unit, a part that is assumed from the predetermined image to be present in the detected direction of the line of sight of the user, and which outputs, as the second image to the panel display unit, an image complementary to the first image for the predetermined image. It is possible to realize the image display device described above, and configurations below may be further adopted.

For example, the retinal scanning display unit may project the first image on a region which includes at least the fovea centralis of the retina of the user. As described above, the region including the fovea centralis of the retina is a range which has the highest resolution in human vision. The first image is displayed in this region and thus it is possible to make the user clearly recognize the first image.

Alternatively, in the image display device described above, the line-of-sight detection unit may include: a first detection unit which detects at least the position and the direction of the head of the user who wears the retinal scanning display unit with respect to the panel display unit; and a second detection unit which detects the positions of the pupils and the direction of the line of sight with reference to the head of the user who wears the retinal scanning display unit. In this image display device, with the first detection unit and the second detection unit, it is possible to detect the positions of the pupils of and the direction of the line of sight of the user who wears the retinal scanning display unit.

Here, the first detection unit is able to adopt at least one of configurations below. Specifically, the first detection unit is able to be set to at least one of:

[1] a three-axis gyro sensor that is provided on a user who wears a retinal scanning display unit so as to detect at least the position and the direction of the user;

[2] an optical reading device that reads the positions of three or more markers whose positions with respect to a panel display unit are known and which are not present on one straight line so as to detect the position and the direction of a user who wears a retinal scanning display unit; and

[3] a magnetic reading device that uses three pickup coils whose positions with respect to a panel display unit are known, which read the intensity of a magnetic field generated with coils and which are arranged orthogonal to each other so as to read the position and the direction of the head of a user who wears a retinal scanning display unit.

On the other hand, the second detection unit is able to be set to at least one of:

[4] an eye camera that is provided in a retinal scanning display unit and that is provided in such a position as to be able to image an eyeball of a user; and

[5] a sensor that optically scans the surface of an eyeball of a user. The ones which are adopted as the first and second detection units are preferably determined according to requirements for the design and manufacturing thereof, such as the cost and the size of a base member and the ease of exchange of signals with a control unit. Alternatively, configurations other than those described above may be adopted.

In the image display device described above, the panel display unit may have such a panel size that the angle of view seen from the user is equal to or more than 60 degrees and equal to or less than 180 degrees in a horizontal direction and is equal to or more than 45 degrees and equal to or less than 120 degrees in a vertical direction. In the angle range described above, the size of the panel display unit is reduced, and thus it is possible to provide a sufficient sense of immersion to the user.

Furthermore, in the image display device described above, in the image output unit, the first image which is displayed with the laser light on the eyes of the user in the retinal scanning display unit is able to be set to an image for stereoscopic view that causes parallax in both the eyes. In this case, the user uses the retinal scanning display unit so as to be able to experience a stereoscopic view, and moreover, the image displayed on the panel display unit does not need to be set to an image for stereoscopic view. Hence, it is possible to achieve both a request for the generation of an image for stereoscopic view and a request for the display of a complementary image in a wide range. In the first place, the first image may be set to an image other than an image for stereoscopic view.

In the image display device described above, the image output unit may output the second image displayed on the panel display unit as an image in which at least one parameter of resolution, brightness, chroma and sharpness (a degree to which an image is not blurred) is lower than the parameter for the first image displayed on the retinal scanning display unit. In this way, it is possible to reduce the time necessary for the generation of the second image and the load of the processing.

In the image display device described above, the image output unit may gradually change, in a boundary between the first image and the second image, the parameter from the side of the first image toward the side of the second image. In this way, the change of the image in the boundary between the first image and the second image is made smooth.

The image display device described above may include: a storage unit which stores three-dimensional data that expresses a predetermined space; an operation unit which changes at least one of the position of and the direction of the line of sight of the user within the predetermined space; and an image generation unit which generates, from the three-dimensional data, as the predetermined image, a picture that is assumed to be visually recognized by the user in the predetermined space when at least one of the position of and the direction of the line of sight of the user is changed. In this way, the user is able to visually recognize the first image and the second image as if the user was seeing the objects within the predetermined space Furthermore, the image display device described above may include: a storage unit which stores three-dimensional data that expresses an object group present in a predetermined virtual space; a coordinate system association setting unit which makes such a setting that a coordinate system of a real space where the user is present and a coordinate system of the predetermined virtual space are associated with each other; and an image generation unit which converts, according to the association of the coordinate systems that is set, the positions of the pupils and the direction of the line of sight that are detected into the positions of the pupils and the direction of the line of sight in the coordinate system of the virtual space, and which generates, from the three-dimensional data, as the predetermined image, a picture that is assumed to be visually recognized in the predetermined virtual space by the user in the virtual space. In this way, with the image display device, the user is able to visually recognize a picture which includes the object group present in the virtual space, and which is assumed to be visually recognized in the predetermined virtual space by the user. Hence, the user is able to have a high sense of immersion in regards to the picture display which is performed in a game or the like with the assumption of a virtual space.

As described above, the image display device is used in a game machine, an entertainment simulator or the like, and thus it is possible to make the user see a picture in the world of a virtual game or a picture of a tourist attraction, a museum or the like. It is also possible to use the image display device for a commercial simulator. As the commercial simulator, the image display device is able to be used, for example, to confirm an urban landscape in an urban development, to visually recognize the interior or the exterior of a construction regardless of the size thereof, or to visualize a molecular structure which is not able to be normally observed with the naked eye, such as data of a three-dimensional structure of a carbon nanotube, a protein or the like. The image display device is able to be utilized as a large monitor display which monitors the state of a plant, various types of infrastructures, or the like, or as a monitor display when a remote operation is performed on the facilities thereof or the like. In this case, a liquid crystal display or the like which has already been provided is utilized as the panel display unit of the present invention, the image display device is configured by combination with the retinal scanning display unit and thus it is possible to effectively utilize the existing facilities.

Although the embodiments of the present invention have been described above, the present invention is not limited to these embodiments, and is able to be practiced with various embodiments. In the present specification, an embodiment in which a configuration that is not described as being essential is omitted is able to be established as one invention. A part of a configuration described as hardware is able to be realized as software. On the other hand, at least a part of a function or a configuration which is realized by software is able to be realized by hardware.

The present invention is able to be utilized for an image processing device, a game machine, a virtual reality display device and the like.

EXPLANATION OF SYMBOLS

10: image display device
20: retinal scanning display unit
21, 22: transmission display unit
24: video camera
26: eye camera 28, 29: temple
31, 32: reflection unit
41, 42: optical engine
50, 50A: panel display unit
51 to 53: marker
59: dome
60: image output device
61: CPU
62: memory
65: GPU
67: operation unit
71: retinal scanning display unit interface
72: panel display unit interface
75: storage interface
90: external storage device
BSA: peripheral region
CSA: central region
EL, ER: left and right eyes
USR: user

What is claimed is:

1. An image display device that displays a predetermined image for a user such that the user is able to visually recognize the predetermined image, the image display device comprising:
a retinal scanning display unit at least including a laser, a waveguide, and a reflector, the retinal scanning display unit being configured to be worn on a head of the user, the retinal scanning display unit:
outputting a laser light,
changing an output direction of the laser light,
guiding the outputted laser light from the laser to eyes of the user through an optical path, and
by changing the output direction of the laser light, scanning, with the laser light, positions of the each retina of the eyes of the user so as to display a first image that is focused on a position away from the eyes of the user by a first distance, the first image being a first partial image of the predetermined image and the second image being a second partial image complementary to the first image;
a line-of-sight detection unit detecting positions of pupils of the eyes of the user and a direction of a line of sight of the user who wears the retinal scanning display unit;
a panel display displaying a second image different from the first image on a display panel that is provided in a position away from the user by a second distance shorter than the first distance; and
an image output unit (i) extracting a new first partial image and a new second partial image from the predetermined image located in a direction of a new line of sight when the detected direction of the line of sight of the user is changed, (ii) replacing the first partial image with the extracted new partial image, (iii) outputting, as the displayed first image to the retinal scanning display unit, the extracted new first partial image in the direction of the new line of sight of the user, and (iv) outputting, as the displayed second image, to the panel display unit, the extracted new second partial image, which is complementary to the new first partial image.

2. The image display device according to claim 1, wherein the retinal scanning display unit projects the first image on a region including at least a fovea centralis of the retina of the user.

3. The image display device according to claim 1, wherein the line-of-sight detection unit includes a first eye camera and a second eye camera, the line-of-sight detection unit:
detecting at least a position and a direction of the head of the user with respect to the panel display, and
detecting the positions of the pupils and the direction of the line of sight with reference to the head of the user.

4. The image display device according to claim 1, wherein the panel display has a panel size such that an angle of view seen by the user is equal to or more than 60 degrees and equal to or less than 180 degrees in a horizontal direction, and is equal to or more than 40 degrees and equal to or less than 120 degrees in a vertical direction.

5. The image display device according to claim 1, wherein in the image output unit, the first image is an image for stereoscopic view that causes parallax in both of the eyes.

6. The image display device according to claim 1, wherein the image output unit outputs the second image having at least one parameter of resolution, brightness, chroma and sharpness or a degree to which an image is not blurred is lower than a parameter for the first image.

7. The image display device according to claim 6, wherein the image output unit gradually changes, in a boundary between the first image and the second image, the parameter from a side of the first image toward a side of the second image.

8. The image display device according to claim 1, wherein the panel display includes:
a screen in which a retroreflective member is installed on a surface of the panel display, and
a projector that projects the second image from near the head of the user toward the screen.

9. The image display device according to claim 1, further comprising:
a memory storing three-dimensional data that expresses a predetermined space, wherein the image output unit performs:
changing at least one of a position of and a direction of a line of sight of the user within the predetermined space; and
generating, from the three-dimensional data, as the predetermined image, a picture that is visually recognized by the user in the predetermined space when at least one of the position of and the direction of the line of sight of the user is changed.

10. An image display device that displays a predetermined image for a user such that the user is able to visually recognize the predetermined image, the image display device comprising:
a memory storing three-dimensional data that expresses an object group present in a predetermined virtual space;
a retinal scanning display unit at least including a laser, a waveguide, and a reflector, the retinal scanning display unit being configured to be worn on a head of the user, the retinal scanning display unit, by changing the output direction of the laser light, scanning, with the laser light, positions of each retina of the eyes of the user so as to display a first image that is focused on a position away from the eyes of the user by a first distance, the first image being a first partial image of the predetermined image and the second image being a second partial image complementary to the first image;
a line-of-sight detection unit detecting positions of pupils of the eyes of the user and a direction of a line of sight of the user who wears the retinal scanning display unit;
a panel display displaying a second image different from the first image on a display panel that is provided in a position away from the user by a second distance shorter than the first distance; and an image output unit that performs:
- (i) outputting, as the displayed first image to the retinal scanning display unit, an extracted new first partial image in a direction of a new line of sight of the user,
- (ii) outputting, as the displayed second image, to the panel display unit, an extracted new second partial image, which is complementary to the new first partial image,
- (iii) setting a coordinate system of a real space where the user is present, and a coordinate system of the predetermined virtual space are associated with each other, and
- (iv) based on the association of the set coordinate systems, converting the positions of the pupils and the direction of the line of sight that are detected into the positions of the pupils and the direction of the line of sight in the coordinate system of the virtual space, and generating, from the stored three-dimensional data, as the predetermined image, a picture visually recognized in the predetermined virtual space by the user in the virtual space.

11. An image display method of displaying a predetermined image for a user such that the user is able to visually recognize the predetermined image, the image display method comprising:

detecting a direction of a line of sight of the user;

setting a first image, which is a partial image of the predetermined image in the detected direction of the line of sight of the user, and setting a second image, which is a partial image that is complementary to the first image of the predetermined image;

scanning, with laser light, positions of each retina of eyes of the user so as to focus the first image on a position away from the eyes of the user by a first distance and to display the first image;

displaying the second image on a surface of a display panel that is provided in a position away from the user by a second distance shorter than the first distance;

extracting a new first partial image and a new second partial image from the predetermined image located in a direction of a new line of sight when the detected direction of the line of sight of the user is changed;

replacing the first partial image with the extracted new partial image;

outputting, as the displayed first image, the extracted new first partial image in the direction of the new line of sight of the user; and outputting, as the displayed second image, to the panel display, the extracted new second partial image, which is complementary to the new first partial image.

* * * * *